United States Patent Office
3,399,271
Patented Aug. 27, 1968

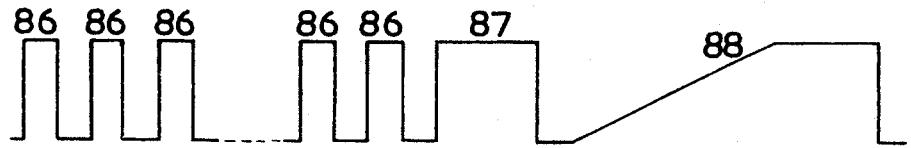
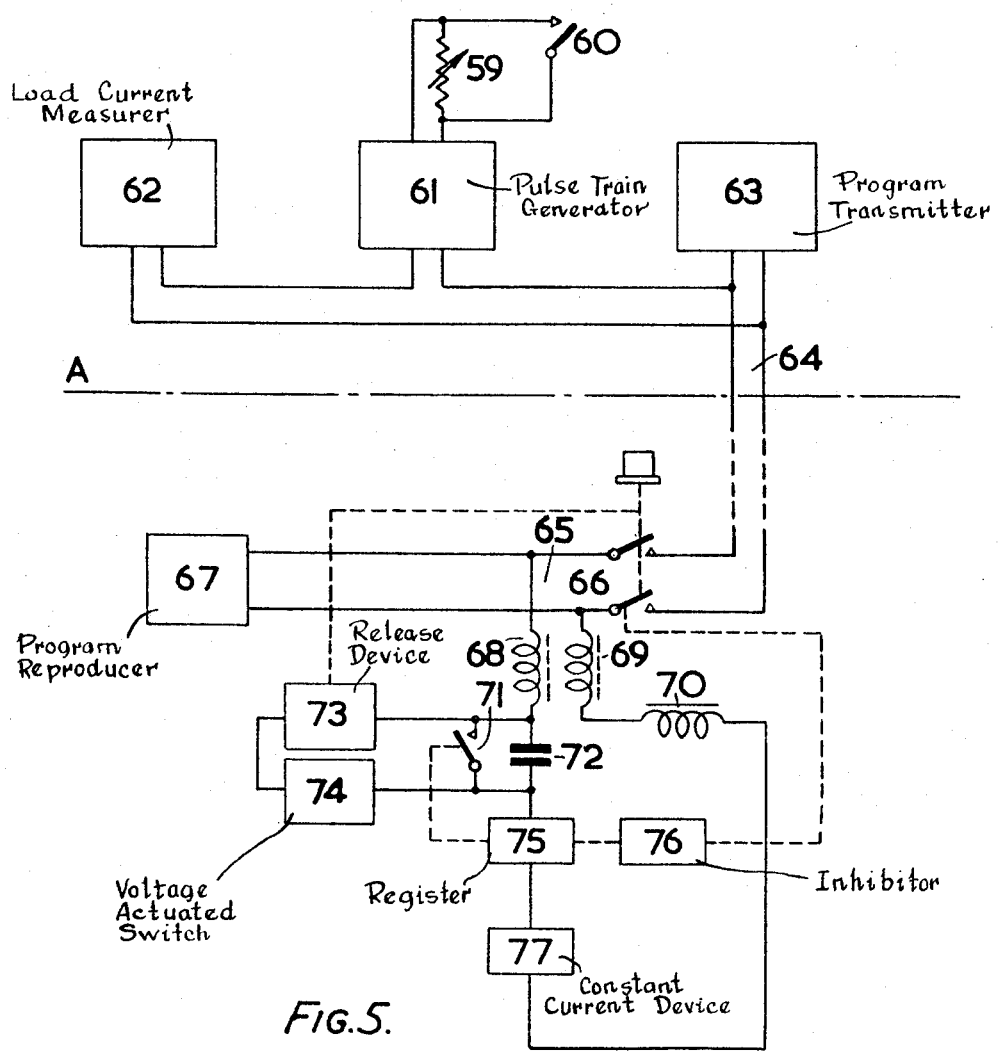

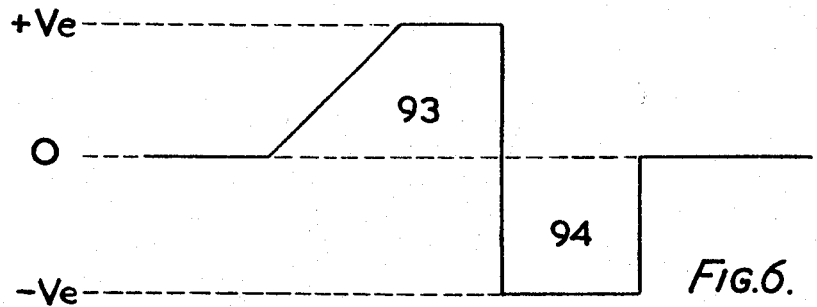
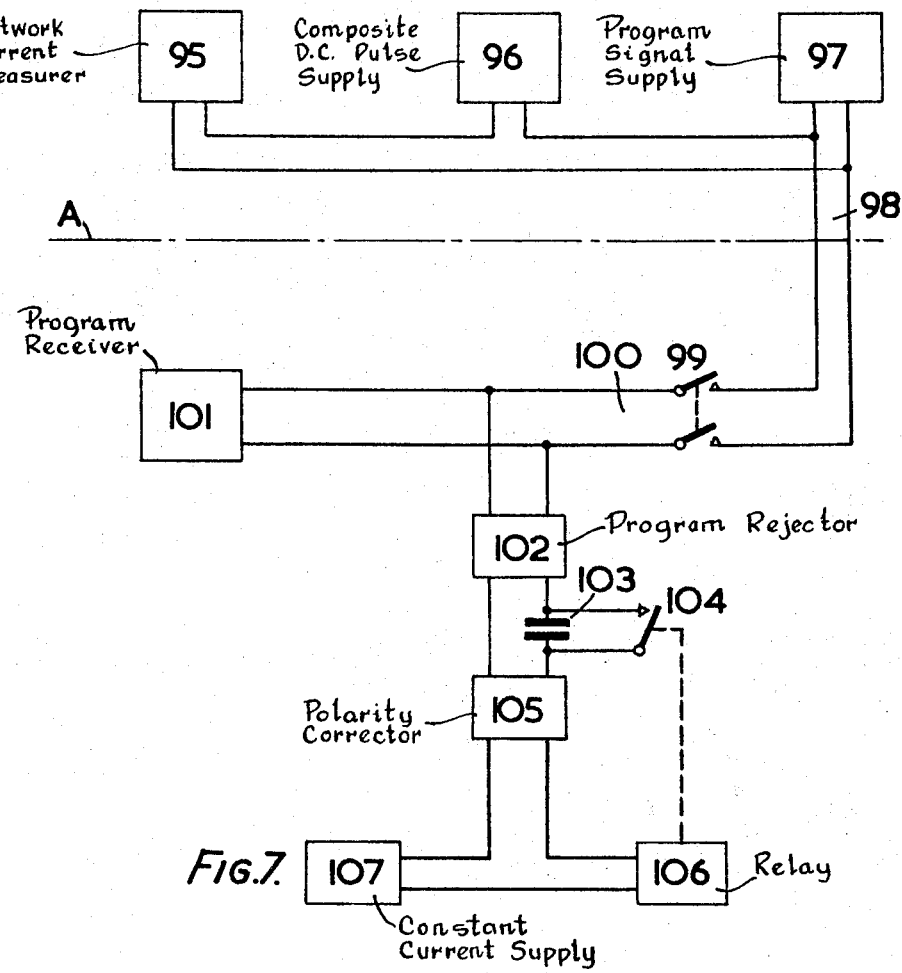

3,399,271
AUDIENCE MEASURING SYSTEM EMPLOYING
CONSTANT CURRENT LOADS
Raymond Alec Butcher, Frimley, Surrey, and Roy Ernest
White, Worcester Park, Surrey, England, assignors to
R. & R. Research Limited
Filed Feb. 18, 1964, Ser. No. 345,789
Claims priority, application Great Britain, Feb. 19, 1963,
6,652/63
23 Claims. (Cl. 178—6)

ABSTRACT OF THE DISCLOSURE

An audience measurement system comprises means for applying to a wire network connecting a transmitter to receiver stations firstly a testing voltage for determining network leakage and secondly a testing voltage having a wave form such that it causes a constant-current device to be shunted across the network at each receiver which is in operation, thus permitting audience measurements to be corrected for network leakage.

---

This invention relates to a broadcast system and to a receiver apparatus, and has as its aim to provide a facility to respond to the reproducing or not of a programme.

This facility is often desirable in order to assess the audience or popularity of a programme, especially when this is broadcast over a system for its reproduction against the effective payment of a fee. Such systems are sometimes known as subscription systems. An example is pay-television.

The invention is especially applicable when programmes are broadcast over a wire network branched to a number of receiver apparatus, perhaps distributed over a large town.

The programme material may consist in information, entertainment, instruction, or the like.

According to the broadest aspect of the invention, there is provided a receiver apparatus comprising control means to reproduce a programme, an input terminal for connection to a physical circuit, a constant current device, and means to make an electrical path between said device and said terminal only when said control means is set to reproduce.

The invention also resides in a broadcast apparatus, comprising at a transmitter station, means to transmit a programme signal for reproduction at a receiver position, means to apply a testing voltage to a terminal in wired connection with said receiver position, and means to respond to the current drawn from the testing voltage applied.

The invention also resides in a wired broadcast system comprising at a transmitter station a terminal in wired connection with a number of receiver apparatus, means to apply to said terminal signals being a programme signal, a pricing signal containing a price-determinative number of temporally distinct events of which the last is a relatively long event constituting an unlocking signal, an audience measurement interrogation signal, and a testing voltage, and audience measurement means to respond to the current drawn from said voltage applied, each said receiver apparatus comprising an input terminal for arrival of said signals and testing voltage, control means to reproduce from the programme signals, and when set to reproduce to admit said pricing signals to receiving and processing means for charging or debiting against use of the receiver apparatus, means to make an electrical path between a constant current device and said input terminal only when said control means is set to reproduce, conditioning means to allow said path to be made only on reception of a said pricing signal, and a locking arrangement by which, once said control means is set to reproduce, said means to receive and process pricing signals remains effective until the arrival at said input terminal of said unlocking signal.

The expression "constant current device" renotes herein a device which draws a substantially constant or marginally varying current over a considerable voltage range, for example 30%, variation of voltages applied to the device.

When the invention is applied to a subscription broadcast system, in which reproduction of at least some programmes at a subscriber's receiver apparatus requires the prior or subsequent payment of a specific charge, it is advantageous for the reproduction control means at each subscriber's station to be so constructed that once set by a subscriber to reproduce a chargeable programme it can return to the off position only when released or unlocked by a signal transmitted for that purpose from the central station. It is then also necessary for the means at each subscriber's position which connects the constant-current load to the programme line to be operated by an audience measurement interrogation signal transmitted from the central station prior to the unlocking signal.

In an advantageous embodiment of such a system a debit-establishing device at each subscriber's receiver position is operated by a pricing signal consisting of a train of brief impulses to which the unlocking mechanism does not respond. In this manner a selected programme may be charged for by transmitting the pricing signal at the end of each programme. This pulse train may be terminated by a longer pulse which causes the unlocking of the selector prior to the commencement of a succeeding programme.

In a modified form of wired entertainment system according to the invention the reproduction control means at each subscriber's position when actuated establishes an operating path for conditioning means, operable by an interrogation signal transmitted from said central station and arranged when so operated to connect said constant-current device to an input terminal, as a load across the wire network. In this case there is also provided at said central station means operable to transmit the interrogation signal to said subscriber's positions.

In the operation of a wired entertainment system in accordance with this modification of the invention, the load presented by the network may be measured at the central station at any time during or immediately after the end of a programme. This load is composed of the leakage current of the network including any leakage in the subscriber's apparatus. The interrogation signal is then transmitted to cause the constant current load device at the location of any subscriber who has set control means to reproduce the programme, to be shunted across the programme line. A further measurement of network load is then made. The load now measured consists of the current taken by the constant-current devices at the positions of those subscribers who have selected a programme together with the leakage current of the distribution network. If the measurement has been made at the end of a programme an unlocking signal is then transmitted to the subscriber's positions to the control or selection means to return to their off positions. By subtracting the former value of load from that of the total load there is obtained a measure of the total current drain due to the constant current devices at the positions of the subscribers who have selected the programme for reproduction, and hence a measure of the number of these subscribers.

Exemplary embodiments of the invention will now be described with reference to the accompanying drawings, in which:

FIGURE 4 shows a composite signal in the form of a pulse train and comprising pricing-, interrogation-, test voltage- and unlocking-signals;

FIGURE 5 shows schematically a broadcast system using the pulse train of FIGURE 4;

FIGURE 6 shows another composite signal in the form of a single composite pulse; and FIGURE 7 shows schematically a wired broadcast system using the pulse of FIGURE 6.

Figure 1:
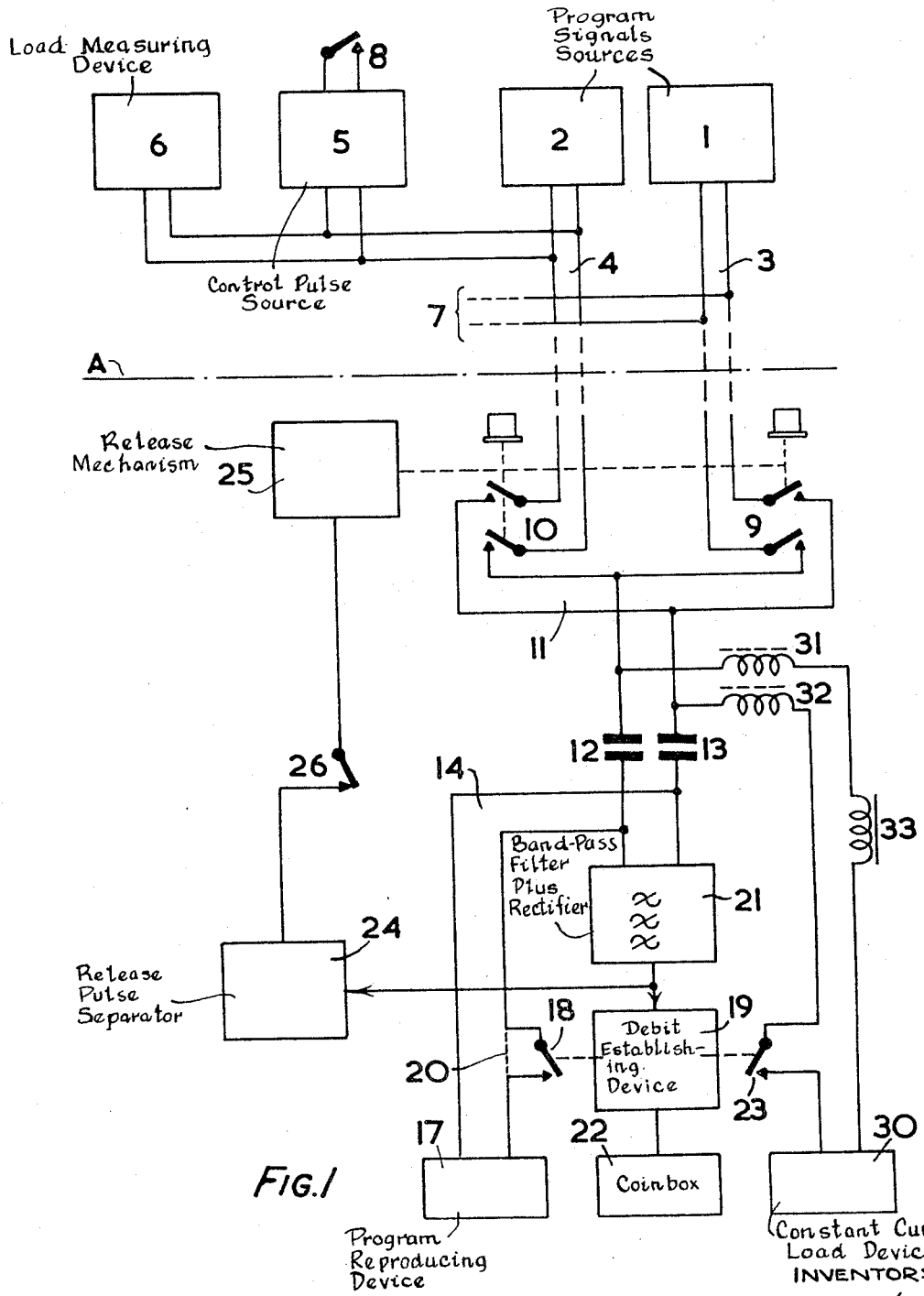
FIGURE 1 is a block schematic diagram illustrating a portion of a wired subscription broadcast system according to the present invention.

In the wired subscription broadcast system illustrated by FIGURE 1 a central station includes those components shown above chain line A. The components, of which only those essential to the understanding of the present invention are shown, comprises two sources 1 and 2 of programme signals the output signals from which are sent out over lines 3 and 4 respectively, a source of control pulses 5 and the network load measuring device 6. These latter devices are connected to line 4 in parallel with programme source 2 over which a subscription programme from source 2 is transmitted. If it is required for both programmes to be subscription programmes, then devices similar to devices 5 and 6 would be connected to line 3 also, by way of the branch indicated at 7.

The operation of devices 5 and 6 will be further described below. For the present it suffices to state that, when its operation is initiated by a manually or automatically actuated switch 8, device 5 transmits a brief audio-frequency signal into line 4, while device 6 when actuated determines the current taken by the distribution network, when a given direct voltage is applied to it.

The receiver apparatus at one subscriber's position only is shown in the lower part of the figure below line A. Lines 3 and 4 are connected to control means, such as push button switches 9, 10 respectively, which switches are interlocked mechanically or electrically to prevent closure of both together. When either of these switches is operated the appropriate signal is fed by way of bus bars 11, isolating capacitors 12 and 13 and feeder connection 14 to a programme reproducing device 17. This may be, for example, a loudspeaker or television picture and sound reproducer depending upon the nature of the entertainment system. Only when a switch 18, which forms part of a debit-establishing device 19, the purpose of which is discussed later, or if, as in some systems, this switch is omitted as indicated by broken line connection 20, does reproducer 17 operate immediately one of selector switches 9, 10 is closed.

Feeder 14 also supplies the incoming signal to a device 21 containing a band-pass filter, designed to pass a narrow band of audio frequencies including the nominal frequency of the pulses transmitted by device 5 at the central station, and a rectifier. Device 21 thus yields unidirectional voltage pulses corresponding with the applied bursts of audio-frequency voltage. An output is therefore provided by device 21 only when a signal of the appropriate frequency is transmitted by device 5. Output signals from device 21 are applied both to debit-establishing device 19 and to unlocking means or, in this embodiment a release pulse separator 24. In one form of this embodiment of the invention, for use when prepayment for selected programmes is required, debit-establishing device 19 is arranged to respond to pricing pulses from device 5 by producing an appropriate reduction in a credit previously established by the insertion of coins in a coinbox 22. In this case the reduction of the credit either to zero or, in some cases, to a value less than the maximum possible charge for any programme, causes contacts 18 to open and thus prevents the reproduction of further programmes until an appropriate credit has been re-established. In another form of this embodiment, where credit is allowed, device 19 is arranged merely to record the amount of debit established by applied pulses.

Whatever the operation performed in device 19 it will involve the actuation of an electromagnetic device once per received pulse. This device is provided with an auxiliary contact 23. Thus each pulse represents a unit of price.

The number of pulses transmitted by device 5 at the end of any programme will depend upon the charge to be made for that programme. Whatever the number of these pulses, the last of them has a duration greatly exceeding that of the preceding pulses. This extended pulse has on device 19 exactly the same effect as the shorter pulse or pulses which preceded it. Release pulse separator 24, however, to which the pulses from filter 21 are also applied, is arranged not to respond to the shorter pulses in any pulse train transmitted by device 5 but to respond to the final, extended pulse of the train which thus constitutes an unlocking signal. Separator 24 may, for example, comprise a long-time-constant combination of series resistance and shunt capacitance or some other arrangement suitable to the purpose, many of which have been proposed in connection with the separation of line and field synchronising impulses in television receivers. Whatever its nature, device 24 is arranged when a long pulse is received to activate a release mechanism 25 which until so activated locks switch 10 in the operated position until the end of the selected programme. In those cases where an alternative subscription programme is provided on line 3 also the mechanism 25 will be arranged to lock whichever of switches 9, 10 has been operated in its operated condition until the end of the selected programme, when an unlocking signal will be received.

The arrangements this far described ensure that once a programme has been selected the operator selector switch will remain operated until an appropriate debit has been established and will then be released to allow a further programme selection to be made. Contact 23, however, is arranged when closed by a pulse from device 5 to connect a constant-current load device 30 in shunt with bus-bars 11 and hence in shunt with whichever of lines 3, 4 has been providing the selected programme. In order that device 30 shall not affect the normal operation of the programme circuits it is connected to bus-bars 11 by way of high frequency chokes 31, 32 and an audio-frequency choke 33.

Figure 2:
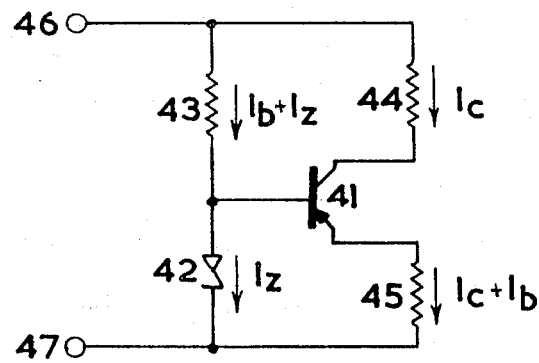
FIGURE 2 is a circuit diagram of one embodiment of constant current device as may be used in carrying out the invention.

For the purpose of the present invention constant-current device 30 is required to pass a substantially constant-current over a relatively wide range of applied direct voltage. One device suitable for this purpose when the measuring device uses direct current is indicated in FIGURE 2. This consists of a p-n-p transistor 41 and a Zener diode 42 together with three resistors 43, 44, 45. The base of transistor 41 is connected to one terminal 46 of the device by way of resistor 43 and its collector is connected to the same terminal by way of resistor 44, while the base of the transistor is also connected to the other terminal 47 of the device by way of Zener diode 42 and its emitter is connected to this terminal by way of a resistor 45. If the current flowing to the base of transistor 41 is $I_b$, that to the collector $I_c$ and that passed by Zener diode 42 is $I_z$, then it may be shown that as the direct voltage applied between terminals 46 and 47 varies $I_c$ tends to remain constant while $I_b+I_z$ varies with the applied voltage. Provided that $I_b+I_z$ is a small fraction of the total load current it is possible to arrange that there will be only a marginal drop in load current for a 30% drop in applied voltage. The low slope resistance of the Zener diode, combined with a relatively high value of emitter resistance gives reasonable thermal stability, or if desired, a separate additional temperature-compensating device may be incorporated.

Alternative known constant-current devices may be employed if convenient. One such device employs the constant anode current characteristic of a pentode valve having its screen and control grids at constant potentials with respect to the cathode. Other devices depend upon the constant-current passed by a saturated thermionic diode or by a reverse-biased semiconductor diode. Still other constant-current devices which are useful for alternating current, make use of barretters or saturated inductors.

Figure 3:
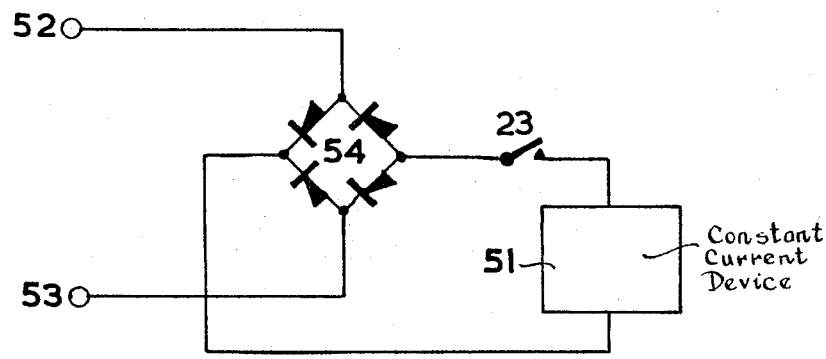
FIGURE 3 is a circuit diagram of an alternative embodiment of constant current device suitable for use in carrying out the invention.

With some of these devices the practical problem arises that it may be operationally inconvenient to ensure special polarity of connection of the programme circuit to the subscriber's apparatus. In a system in which this is true it is necessary to arrange that the constant-current device shall be equally effective whichever the polarity of the programme lines. A means of meeting this situation is shown in FIGURE 3. Here a polarity-conscious constant-current device 51 is connected to the programme line at terminals 52, 53 by way of contact 23 referred to in the description with reference to FIGURE 1 and by way of a rectifier bridge 54. If silicon rectifiers are used in bridge 54 the reverse resistance of those rectifiers which are shunted in reverse polarity across the input terminals will be high enough for their leakage current to be ignored. Other rectifiers with appreciable leakage may be used, but in such a case it will be necessary for contact 23 to be connected directly in series with the load proper as shown in FIGURE 3, so that the bridge leakage is measured as part of the network leakage.

To obtain the desired audience-measurement, a device 6 is arranged to apply a testing direct voltage to the network shortly before the debit-establishing pricing pulses are transmitted by device 5. The current which then flows is due entirely to the network leakage including any rectifier leakage as described above. When the audio-frequency pulses are transmitted by device 5 contact 23 at each connected subscriber's station closes to connect constant-current device 30 to the line and the current then taken by the network increases by an amount proportional to the number of subscribers by whom the programme has been selected. The difference in the two currents may therefore be used as a measure of the audience. The direct voltage is hence used first as a leakage-testing voltage and then as an audience measurement testing voltage, the leakage determination being applied to correct the audience determination.

Referring to FIGURE 4, there is shown a D.C. pulse train comprising a number of short pricing pulses 86, a final long pricing pulse 87 and an unlocking pulse 88. Each pricing pulse 86 and 87 represents a unit of price, and the long pulse 87 serves additionally both as an audience measurement interrogation signal and a test voltage. Unlocking pulse 88 serves also as a leakage test voltage, and has a long smooth rise portion so as to be distinct from a pricing pulse 86 or 87.

This D.C. pulse train is further explained in its use by the subscription broadcasting system of FIGURE 5, which shows central broadcasting station apparatus above, and a subscriber's receiver apparatus below, the dashed line A.

The broadcasting station apparatus has, means 61 to generate the pulse train of FIGURE 4 controlled by means exemplified by variable and contact elements 59 and 60, a programme transmitter 63 and a load current measurer 62. Transmitter 63 is coupled to the terminal of a wire network 64, which is branched to all the subscribers in parallel. Generating means 61 and current measurer 62 in series, shunt the network so that the network current is measured when the test voltages supplied by pulses 87 and 88 are applied to the network.

All the subscribers may have apparatus like that shown below dashed line A. The pulse train of FIGURE 4 and programme signals are received from the wire 64 at an input terminal (not shown). Control means such as switch 66 can be set by the subscriber to reproduce a desired programme on reproducer 67 which may be a television receiver. Switch 66 is arranged such that once closed, it is locked in the reproducing position until unlocked or switched off automatically on reception of unlocking signal 88. This arrangement ensures that the subscriber is charged against a programme reproduced since he is then bound to receive pricing pulses 86 and 87 which precede signal 88.

The D.C. pulse train is separated from the programme signals by high-frequency rejecting chokes 68 and 69 and audio-frequency rejector 70 in the input to a loop shunting the network as switched on by switch 66. The loop contains in series a capacitor 72, a price (or debit) register 75 and a constant-current device 77 as defined above. Shunting the capacitor 72 is a contact 71 controlled by the loop current, and an unlocking loop controlled by the voltage across capacitor 72 and perhaps comprising voltage actuated switch 74, such as a four layer switching diode, and unlocking or release device 73 coupled to switch 66.

Pricing pulses 86 and 87 have steep leading edges and hence are differentiated by capacitor 72 to cause an appreciable loop current, sufficient to close contact 71 and also to register the pricing pulse on register 75. The long price pulse 87 is registered as a price pulse at 75 and its voltage is also applied to constant current device 77 for sufficient time for current measurer 62 to respond to the current taken. The total current taken by the network will clearly depend on the number of subscribers having set switch 66 to reproduce. There may, of course, be more than one long pricing pulse.

The leading edge of pulse 87 is therefore effective as an interrogation signal conditioning contact 71 to close, making a steady D.C. path between device 77 and the network wire 64, whereon the flat portion of long pulse 87 is an audience measurement test voltage.

The current taken from pulse 87 by the network will depend not only on the audience but on the electrical leakage of the network, which may vary from time to time.

The correction for leakage is determined by the pulse 88, which has a leading edge insufficiently steep to cause the capacitor 72 to be short-circuited. Thus constant-current device 77 is not connected to the network, and the test voltage represented by the flat portion of pulse 88 is effective to test the total leakage only.

Since pulse 88 as differentiated by capacitor 72 does not cause sufficient loop current for contact 71 to close, the capacitor charges up gradually towards maximum voltage of the pulse, actually the leakage test voltage, until its voltage actuates switch 74 energising unlocking device 73, which causes switch 66 to be switched off. Thus pulse 88 first unlocks and then tests leakage at its flat portion, with the subscribers disconnected.

If desired, the operation of switch 66 may be inhibited by an inhibitor 76 associated with price register 75.

A further embodiment of the invention is illustrated in FIGURES 6 and 7. Apparatus at the central broadcast station shown above dashed line A (FIGURE 7) comprises means 97 to apply programme signals and means 96 to apply a composite D.C. pulse (see FIGURE 6) to a wire network 98 branched to subscribers. The pulse has two portions 93 and 94, each characterised by a sustained test voltage conveniently of equal and opposite polarity. A network current measurer 95 responds to the currents taken as the two portions are applied in turn to the network. Portion 93 rises slowly, but terminates abruptly with a transient leading to portion 94. Apparatus at a typical subscribers position may comprise a control switch 99 to reproduce programmes on means 101 via wire 100 across which is connected a loop having a programme signal rejector 102 at its input. The loop comprises a constant-current device 107 and a relay 106, which connects device 107 to the line 100 by contact 104 when sufficient current passes through the loop. The contact 104 is effective to short-circuit a capacitor 103.

No arrangement is shown to charge for a programme which may be free, or charged for by means not illustrated.

At some time during a programme, the pulse of FIGURE 6 is transmitted. The portion 93 has a leading edge insufficiently steep to actuate relay 106 as differentiated by capacitor 103, which charges slowly to the network voltage.

The current measured at 95 represents the total leakage of the network for the voltage applied by portion 93.

When the transient between pulse portions 93 and 94 arrives, the charge voltage across the capacitor is added to the voltage defined by portion 94, and a substantial current flows through the relay 106, which thereupon closes contact 103.

The voltage of pulse portion 94 is now applied to the constant current devices 107 of all the subscribers receivers set to reproduce, and the current measured at 95 represents the audience to the programme, and the leakage.

The two current measurements suffice to give a determination of the audience.

A polarity corrector 105 ensures that the voltage applied to device 107 has a given polarity.

In all the embodiments shown, the receiver apparatus has relatively inexpensive additional means to respond to the reproduction of programme so that all the apparatus may quite cheaply incorporate it.

Also the test voltages and feeding network resistances need not be precisely determined since the voltages applied to constant current devices may vary over a wide range.

A substantial advantage provided by the embodiments described above is that the effect of the series resistance of the distribution network upon the accuracy of audience-measurement is negligible since the current drawn by each subscriber's apparatus is substantially constant over the limits of the applied voltage encountered in practice. A further advantage is that the effects of varying shunt leakage upon the accuracy of measurement may be substantially wholly removed by measurement of this leakage at substantially the same time as each audience-measurement, so that the final measurement is independent of fluctuations in the network leakage.

We claim:

1. A receiver apparatus comprising programme reproducing means, said reproducing means including control means settable to permit said reproducing means to reproduce programme input terminals for connection to a physical circuit, a constant current device, said device acting to pass a substantially constant current over a wide range of applied voltage, and switch means to establish an electrical path between said terminals by way of said device only when said control means is set to permit programme reproduction.

2. An apparatus according to claim 1 and comprising conditioning means, said means responding to the arrival at the apparatus of an audience measurement interrogation signal having a predetermined nature to allow said path to be established.

3. An apparatus according to claim 2 comprising pricing means to receive and respond to a pricing signal whereby a price may be charged or debited for use of the apparatus, and switch means controlling the operation of said pricing means, said switch means operating to cause said pricing means to become operable when said control means is set to permit programme reproduction, and wherein said conditioning meas establishes said electrical path in response to reception of said pricing signal, which thereby serves also as said interrogation signal.

4. An apparatus according to claim 3 comprising locking means, said locking means operating in response to said control means being set to permit programme reproduction to cause said pricing means to remain effective until the arrival at the apparatus of an unlocking signal.

5. An apparatus according to claim 4 wherein said input terminal serves as an input for programme signals and pricing signals received over a wire circuit.

6. An apparatus according to claim 5 wherein pricing means comprises filter means coupled to said input terminals, said filter means having a preferential response in a predetermined frequency band, counter means responsive to the number of events in a signal having a predetermined frequency within said frequency band and means including said filter means connecting said input terminals to said counter means whereby said counter means is operated thereby to charge or debit a price denoted by the number of said events.

7. An apparatus according to claim 6 wherein said locking means is responsive to a relatively long event but not to a relatively short event in a signal of said predetermined frequency, and wherein said locking means is coupled to the output of said filter means, whereby said long event constitutes said unlocking signal.

8. A broadcast apparatus, comprising at a transmitter station; means to transmit a programme signal for reproduction at a receiver position, said receiver position including programme reproducing means, said reproducing means including control means settable to permit said reproducing means to reproduce a programme, input terminals for connection to a physical circuit, a constant-current device, said device acting to pass a substantially constant current over a wide range of applied voltage, and switch means to establish an electrical path between said terminals by way of said device only when said control means is set to permit programme reproduction, output terminals, a wire circuit connecting said output terminals with said input terminals at said receiver position, testing means operable to apply a testing voltage to said output terminals and to measure the current drawn in response to the applied testing voltage.

9. An apparatus according to claim 8 and comprising means to transmit over said wire circuit an interrogation signal for audience measurement.

10. An apparatus according to claim 9 comprising at the transmitter station means to transmit a pricing signal denotive of the price to be charged for reproduction of a transmitted programme, said pricing signal containing a component serving as said audience measurement interrogation signal.

11. An apparatus according to claim 10 wherein said pricing signal contains a price determinative number of temporally distinct events, the last said event having a characteristic whereby it is distinguished from any previous event of said pricing signal and wherein said receiver position apparatus includes means responsive to said last event to unlock a locking arrangement by which the pricing signals are effective to cause the price to be charged or debited.

12. A wired broadcast system comprising at a transmitter station a terminal in wired connection with a number of receiver apparatus, means to apply to said terminal signals being a programme signal, a pricing signal containing a price-determinative number of temporally distinct events of which the last is a relatively long event constituting an unlocking signal, an audience measurement interrogation signal, and a testing voltage, and audience measurement means to respond to the current drawn from said voltage applied, each said receiver apparatus comprising an input terminal for arrival of said signals and testing voltage, control means to reproduce from the programme signals, and when set to reproduce to admit said pricing signals to receiving and processing mean for charging or debiting against use of the receiver apparatus, means to make an electrical path between a constant-current device and said input terminal only when said control means is set to reproduce, conditioning means to allow said path to be made only on reception of a said pricing signal, and a locking arrangement by which, once said control means is set to reproduce, said means to receive and process pricing signals remains effective until the arrival at said input terminal of said unlocking signal.

13. The use of a system according to claim 12 wherein the voltage is applied and a total current measurement registered both when said constant-current devices may be connected as loads due to said interrogation signal, and when they are not so connected, in order to give an indication of the audience a programme while allowing for the prevailing network leakage factor.

14. A receiver apparatus according to claim 3, wherein said pricing means receives and responds to a pricing signal which includes a number of D.C. pulses having a predetermined rapid rise time, each representing a unit of price, wherein said conditioning means responds only to a said D.C. pulse of relatively long duration to establish said electrical path, said long D.C. pulse thus constituting the interrogation signal.

15. A receiver apparatus according to claim 14 wherein, on said path being established, said relatively long pulse is applied as a testing voltage to said constant-current device.

16. An apparatus according to claim 4 wherein said locking means responds only to a further D.C. pulse having a rise time slower than that of said pricing D.C. pulses, which further pulse constitutes said unlocking signal.

17. A wired broadcast system comprising a transmitter station connected by a wire network to a plurality of receiver apparatus, each said apparatus being as defined in claim 16, said station comprising means to apply to the network a programme signal and a pricing signal comprising a price-determinative number of D.C. pulses, of which all save the last have a common predetermined duration and the last of which has a duration substantially longer than that of the preceding said pulses.

18. A system according to claim 17 comprising at said transmitter station means to determine the current taken by the network during said pulse of longer duration whereby said longer pulse serves both as an interrogation signal and as a testing voltage for audience measurement.

19. A system according to claim 18, comprising at said transmitter station means to apply to the network a further D.C. pulse having a slower rise time than the pricing signal pulses and constituting said unlocking signal.

20. A system according to claim 19 comprising at said transmitter station means to measure the total current taken by said network during said further pulse, so that said further pulse constitutes a network leakage-testing signal for correction in audience measurement.

21. A wired broadcast system comprising a transmitter station connected by a wire network to a number of receiver apparatus as defined in claim 2, said station comprising means to apply to the network a programme signal and a composite signal, having a relatively slow rising portion to a leakage-testing voltage portion and an audience measurement interrogation signal being a relatively fast voltage change to an audience-testing voltage portion, and means to respond to the leakage and audience measurement currents taken by said network from the two voltage portions respectively, and in said receiver apparatus, said conditioning means comprising means responsive to said relatively fast change but not said relatively slow rise to allow said electrical path to be made between said device and said terminal.

22. A system according to claim 21 wherein said two testing-voltage portions in said composite signal have opposite D.C. polarities.

23. In a system according to claim 22, receiver apparatus comprising a loop coupled to the terminal via said control means to reproduce a programme, which loop comprises in series a capacitor, said constant current device, and an electric switch means responsive to a threshold current level effectively to short circuit said capacitor, whereby said relatively fast voltage change in said composite signal involving polarity reversal is effective to short-circuit said capacitor to make said electrical path.

References Cited

UNITED STATES PATENTS

| | | | |
|---|---|---|---|
| 3,249,689 | 5/1966 | Davis | 178—5.1 |
| 3,281,695 | 10/1966 | Bass | 325—31 |

ROBERT L. GRIFFIN, *Primary Examiner.*

H. W. BRITTON, *Assistant Examiner.*